United States Patent
Brezinski

(10) Patent No.: US 9,767,013 B1
(45) Date of Patent: *Sep. 19, 2017

(54) DETECTING CODE ALTERATION BASED ON MEMORY ALLOCATION

(71) Applicant: AMAZON TECHNOLOGIES, INC., Seattle, WA (US)

(72) Inventor: Dominique Imjya Brezinski, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/158,359

(22) Filed: May 18, 2016

Related U.S. Application Data

(63) Continuation of application No. 14/133,418, filed on Dec. 18, 2013, now Pat. No. 9,348,742.

(51) Int. Cl.
| | |
|---|---|
| G06F 21/56 | (2013.01) |
| G06F 12/02 | (2006.01) |
| G06F 21/57 | (2013.01) |
| G06N 99/00 | (2010.01) |

(52) U.S. Cl.
CPC ........ *G06F 12/0223* (2013.01); *G06F 21/566* (2013.01); *G06F 21/577* (2013.01); *G06N 99/005* (2013.01); *G06F 2221/034* (2013.01)

(58) Field of Classification Search
None
See application file for complete search history.

(56) References Cited

U.S. PATENT DOCUMENTS

| | | |
|---|---|---|
| 8,607,348 B1 | 12/2013 | Satish et al. |
| 2009/0094175 A1 | 4/2009 | Provos et al. |
| 2009/0300765 A1 | 12/2009 | Moskovitch et al. |
| 2013/0152200 A1 | 6/2013 | Alme et al. |

OTHER PUBLICATIONS

Lanier, Benjamin E., "Non-Final Office Action dated Jul. 23, 2015", U.S. Appl. No. 14/133,418, The United States Patent and Trademark Office, Jul. 23, 2015.
Lanier, Benjamin E., "Final Office Action dated Nov. 5, 2015", U.S. Appl. No. 14/133,418, The United States Patent and Trademark Office, Nov. 5, 2015.
Lanier, Benjamin E., "Notice of Allowance dated Jan. 29, 2016", U.S. Appl. No. 14/133,418, The United States Patent and Trademark Office, Jan. 29, 2016.

*Primary Examiner* — Benjamin Lanier
(74) *Attorney, Agent, or Firm* — Lindauer Law, PLLC

(57) ABSTRACT

Techniques are described for identifying anomalous execution instance of the process as a security risk by analyzing the memory allocation for the process. Performance data describing memory allocation data describing the amount of memory allocated for a process or utilized by a process during its execution. A baseline of memory allocation is established for the plurality of executions of the process by applying a statistical distribution to the performance data collected. A memory allocation for the executing process may be compared to the baseline. An anomalous execution instance of the process that is outside a predetermined number of statistical variances of the baseline may be determined. At least one anomalous execution instance of the process may be designated as a security risk based at least partly on the anomalous memory allocation.

20 Claims, 10 Drawing Sheets

DETECTING CODE ALTERATION BASED ON MEMORY ALLOCATION

PRIORITY

This application claims is a continuation of, and claims priority to, pending U.S. patent application Ser. No. 14/133, 418 filed on Dec. 18, 2013, entitled "Detecting Code Alteration Based on Memory Allocation". The entirety of this previously filed application is hereby incorporated by reference.

BACKGROUND

To support their operations, providers of online services or other computing services may deploy a large number of executable code modules and libraries within a computing environment. Such large deployments may enable an organization to maintain quality of service under a variety of operating conditions. However, a complex deployment of a large number of files may create challenges when ensuring the security and integrity of the deployed files.

Figure 1:
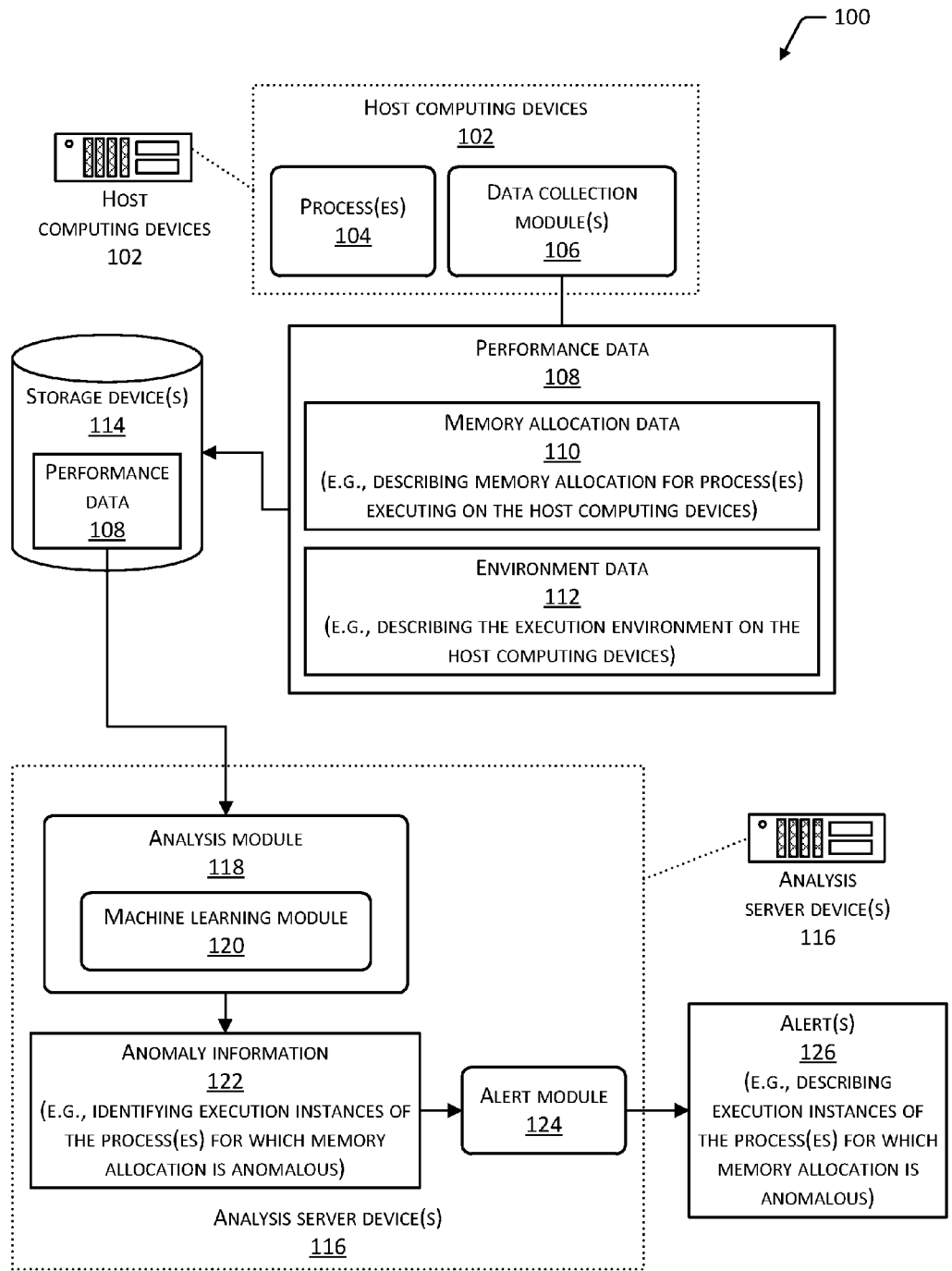
FIG. 1 depicts an environment including one or more analysis server devices for identifying process execution instances that exhibit anomalous memory allocation.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for identifying potential security risks based on detecting an anomalous memory allocation during one or more executions of a process. Code injection is a technique that may be employed by malware, attacker remote access tools, or other types of attacks to establish command and control of a system. In such attacks, executable code may be injected into or otherwise incorporated into an existing process on a target computing system. When the existing process executes, the process may allocate additional memory (e.g., active, physical, or runtime memory) and copy the injected binary executable code into the newly allocated memory. The injected code may then be executed (e.g., as a new thread) to provide unauthorized access to the computing system, read, copy, or alter files or registry entries, perform cryptographic operations, or perform other unauthorized operations on the computing system. The injected code may exhibit high volatility and may leave minimal or no detectable artifacts such as files or registry entries. However, the process that is the target of the attack may have additional memory allocated in the process memory space to hold the injected code.

As described herein, a potential security risk such as a potential code injection may include scenarios in which there is at least a likelihood that a security risk is present. Accordingly, a potential security risk includes an actual security risk, such as a scenario in which malicious code has been injected into a process or a scenario in which the process has been otherwise altered to perform unauthorized operations on a host computing device. On determining that a potential security risk is present with regard to a process, implementations may flag the process as suspicious and provide information enabling further investigation of the process to determine whether the potential security risk is an actual security risk, e.g., whether the anomalous memory allocation is evidence of an actual code injection that may compromise security of the host computing device.

Implementations detect potential code injections or other types of potential security risks by analyzing the memory allocation for a process executing on one or more host computing devices. In some implementations, memory usage or allocation metrics are collected for one or more processes executing on a plurality of host computing systems. Such metrics may be incorporated into performance data, which is sent to one or more analysis server devices for analysis. Based on the performance data collected from a plurality of host computing devices, a baseline for memory usage may be established. The establishment of the baseline memory allocation may employ a statistical distribution to establish a typical or normal memory allocation for a process while it is executing. The establishment of the baseline memory allocation may also employ supervised or unsupervised machine learning techniques such as clustering or classification. Once a baseline memory allocation is established, the performance data collected for executing processes may be compared to the baseline. A process that exhibits an anomalous memory allocation compared to the baseline may be designated as a potential security risk and flagged for further analysis to determine whether malicious code has been injected into the process.

FIG. 1 depicts an environment 100 in which implementations may operate to identify process execution instances that exhibit anomalous memory allocation. As shown in FIG. 1, the environment 100 may include one or more host computing devices 102. The host computing device(s) 102 may comprise any type of computing device, including but not limited to a server computer, a personal computer, a network computer, a cloud computing or distributed computing device, a smartphone, a tablet computer, a wearable computer, an implanted computer, a mobile gaming device, an electronic book reader, an automotive computer, a desktop computer, a laptop computer, a thin client, a terminal, a game console, a smart appliance, a home entertainment device, and so forth. In some cases, two or more of the host computing devices 102 may comprise a cluster, cloud, farm, or other grouping of multiple devices that coordinate operations to provide load balancing, failover support, parallel processing capabilities, shared storage resources, or other aspects. Although examples herein may describe the host computing devices 102 as physically separate devices, implementations are not so limited. In some cases, the host computing devices 102 may be a plurality of virtual computing environments, hypervisors, device emulations, or virtual machines executing on one or more physical computing devices. The host computing device(s) 102 are described further with reference to FIG. 5.

One or more processes 104 may be installed or otherwise presented in memory on the host computing device(s) 102. The process(es) 104 may include any type of process that is executable on the host computing device(s) 102. The process(es) 104 may include any number of code modules (e.g., software modules) in the form of files or components arranged according to any format. The process(es) 104 may include execution instances of programs as compiled, binary, machine-executable files or libraries. The process(es) 104 may also include execution instances of scripts, batch files, or programs that are executable within a runtime, a virtual machine, or an execution engine. A process 104 may include any number of software modules as executable programs, libraries, resources, application programming interfaces (APIs), and so forth. In some cases, the process(es) 104 for which memory allocation is to be analyzed may be installed on a plurality of the host computing devices 102. Such process(es) 104 may include frequently executed processes, such as processes that execute as part of an operating system or processes that support widely deployed computing services. Moreover, in some cases the process(es) 104 to be analyzed may include processes that have privileged access to systems on the host computing device(s) 102. The frequent execution and privileged access of the process(es) 104 may make them attractive targets for malicious code injection or other types of attacks.

The host computing device(s) 102 may execute one or more data collection modules 106, which operate to collect performance data 108 on the host computing device(s) 102. The data collection module(s) 106 may collect the performance data 108 while the process(es) 104 are executing, such that the performance data 108 describes a state, environment, or configuration of the host computing device(s) 102 during execution of the process(es) 104. In some cases, the data collection module(s) 106 may execute periodically (e.g., one or twice a day) to collect the performance data 108. Alternatively, the data collection module(s) 106 may execute substantially continuously to collect the performance data 108.

Figure 2:
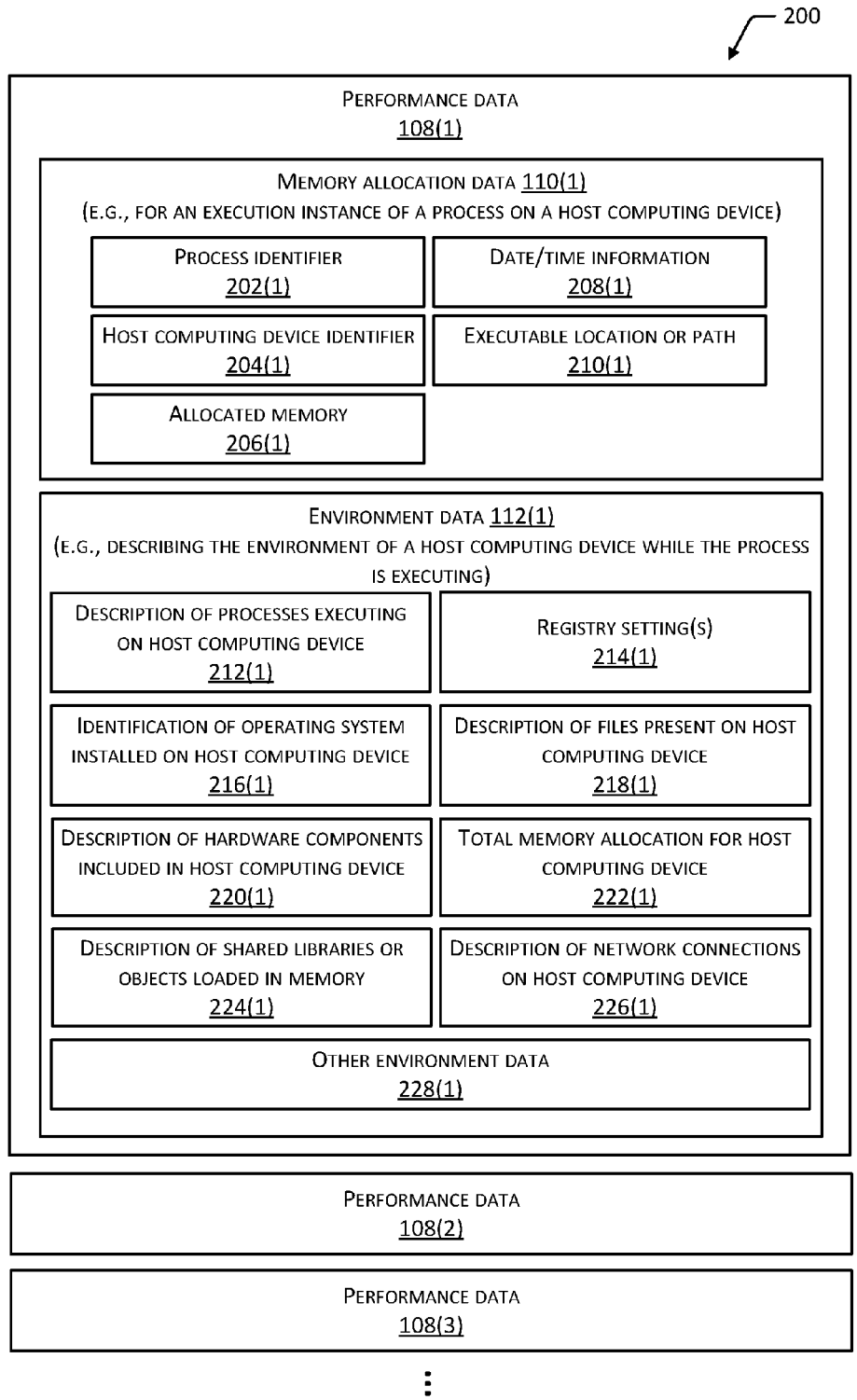
FIG. 2 depicts a schematic of example performance data, including memory allocation data and environment data, which may be employed to identify process execution instances that exhibit anomalous memory allocation.

FIG. 2 depicts a schematic 200 of an example of the performance data 108. The performance data 108 may include any number of sets or vectors of performance data 108(1), 108(2), and so forth, each describing an execution instance of a process 104 on one of the host computing devices 102. As shown in the example, each set or vector of the performance data 108 may include memory allocation data 110 that describes the memory allocation for the process(es) 104 executing on the host computing device(s) 102, and environment data 112 that describes an environment, state, or configuration of the host computing device(s) 102 while the process(es) 104 are executing. For example, a set or vector of performance data 108(1) may include memory allocation data 110(1) for a particular execution instance of a process 104 on a host computing device 102, and environment data 112(1) describing the environment, state, or configuration of the host computing device 102.

The memory allocation data 110(1) may include a process identifier 202(1) that identifies the process 104. The process identifier 202(1) may include one or more of a process name of the process 104. The process identifier 202(1) may also include a description of a version of the process 104, such as a version number, build number, date/time stamp of the binary executable file for the process 104, and so forth. In some cases, the process identifier 202(1) may be a Globally Unique Identifier (GUID) that identifies the process 104. The memory allocation data 110(1) may also include a host computing device identifier 204(1) that identifies the host computing device 102 on which the process 104 is executing or has executed. The host computing device identifier 204(1) may include one or more of a host name or a network address, such as an Internet Protocol (IP) address of the host computing device 102.

The memory allocation data 110(1) may include an allocated memory 206(1), describing the amount of memory allocated for the process 104. The allocated memory 206(1) may describe the amount of memory using any unit of measure, such as a number of kilobytes, megabytes, and so forth. In some implementations, the memory allocation data 110(1) may include date/time information 208(1) describing one or both of a date or a time when the allocated memory 206(1) was determined for the process 104. The memory allocation data 110(1) may also include an executable location or path 210(1), describing a location of or path to the binary executable of the process 104 in the file system of the host computing device 102.

The performance data 108(1) may also include environment data 112(1) that describes the operating state, configuration, or environment of the host computing device 102 identified by the host computing device identifier 204(1). The environment data 112(1) may include a description of processes executing on the host computing device 212(1), such as a list of some or all of the processes (e.g., other than the process 104 being analyzed) executing at the date and time indicated by the date/time information 208(1). The environment data 112(1) may include registry setting(s) 214(1), listing some or all of the keys, values, or other settings present in the registry of the host computing device 102 at the date and time indicated by the date/time information 208(1). In some implementations, the environment data 112(1) may include an identification of the operating system installed on the host computing device 216(1), including a name, description, version number, build number, or other information regarding the operating system present on the host computing device 102 at the date and time indicated by the date/time information 208(1).

In some cases, the environment data 112(1) may include a description of files present on the host computing device 218(1), listing some or all of the files installed or otherwise present on the host computing device 102 at the date and time indicated by the date/time information 208(1). In some implementations, the description of files present on the host computing device 218(1) may be a hash of the files installed on the host computing device 102. The environment data 112(1) may include a description of hardware components included in the host computing device 220(1), listing some or all of the hardware components incorporated into the host computing device 102 or connected to the host computing device 102 (e.g., as peripheral or external devices). The environment data 112(1) may include a total memory allocation for the host computing device 222(1), describing a total amount of memory allocated for all executing processes 104 on the host computing device 102 or a total amount of memory available for executing processes 104 or data storage on the host computing device 102.

The environment data 112(1) may include a description of shared libraries or objects loaded in memory 224(1), such as a description of dynamic-link libraries (DLLs) or other types of shared libraries or shared objects that are loaded in memory on the host computing device 102 during the execution of the process 104. The environment data 112(1) may also include a description of network connection(s) on the host computing device 226(1), including a list of network connections open from the host computing device 102 to other devices during the execution of the process 104. The environment data 112(1) may also include other environment data 228(1), such as the amount of time the host computing device 102 has been operating (e.g., up time), central processing unit (CPU) load on the host computing device 102, and so forth. The performance data 108(1) may be described as a vector of data, the vector including any number of data elements or dimensions such as the various data elements included in the memory allocation data 110(1) and the environment data 112(1).

Returning to FIG. 1, the performance data 108 may be communicated directly or indirectly from the data collection module(s) 106 to one or more storage device(s) 114 that may store the performance data 108. The stored performance data 108 may describe the performance of any number of execution instances of any number of processes 104 executing on any number of host computing devices 102. The storage device(s) 114 may be in communication or otherwise accessible from one or more analysis server device(s) 116. The storage device(s) 114 may comprise any type of data storage system or datastore, such as a relational or a non-relational datastore. Implementations support any type or format of data storage for the storage device(s) 114, including but not limited to a database, an array, a structured list, a tree, a key-value storage, flat files, unstructured data, or any other data structure or format. Although the storage device(s) 114 are depicted as external to the host computing device(s) 102 and the analysis server device(s) 116, in some implementations the storage device(s) 114 may be at least partly incorporated into the host computing device(s) 102, the analysis server device(s) 116, or both the host computing device(s) 102 and the analysis server device(s) 116.

The analysis server device(s) 116 may be any type of computing device, including but not limited to those types of computing devices described with reference to the host computing device(s) 102. In some cases, two or more of the analysis server devices 116 may comprise a cluster, cloud, farm, or other grouping of multiple devices that coordinate operations to provide load balancing, failover support, parallel processing capabilities, shared storage resources, or other aspects. The analysis server device(s) 116 are described further with reference to FIG. 6.

The analysis server device(s) 116 may execute an analysis module 118, which performs operations to retrieve the performance data 108 from the storage device(s) 114, and analyze the performance data 108 collected on one or more host computing devices 102. Operations of the analysis module 118 are described further with reference to FIGS. 7-10. In some implementations, the analysis module 118 may include a machine learning module 120 configured to perform one or more machine learning algorithms or techniques to analyze the performance data 108. Such machine learning may include unsupervised machine learning such as clustering, as described further with reference to FIGS. 3 and 9. The machine learning may also include supervised machine learning such as the training of a classifier, as described further with reference to FIGS. 4 and 10. Although clustering and classification are provided as examples of machine learning techniques that may be employed, implementations are not limited to these examples. Implementations support machine learning algorithms that may include, but are not limited to, one or more of the following: artificial neural networks, inductive logic programming, support vector machines (SVMs), clustering, classification, Bayesian networks, decision tree learning, association rule learning, reinforcement learning, representation learning, similarity learning, metric learning, sparse dictionary learning, and so forth.

The analysis module 118 may analyze the performance data 108, and identify zero or more execution instances of the process(es) 104 for which the memory allocation is atypical or otherwise anomalous. Such execution instances may be described in anomaly information 122. The anomaly information 122 may be sent to an alert module 124 executing on the analysis server device(s) 116. The alert module 124 may generate and send one or more alerts 126 describing the execution instances of the process(es) 104 for which the memory allocation is anomalous, as described in the anomaly information 122. The alert(s) 126 may be sent to one or more users such as system administrators, developers, security analysts, and so forth. The alert(s) 126 may also be sent to any number of other computing devices or processes. The alert(s) 126 may enable users, devices, or processes to further investigate the execution instances that exhibit anomalous memory allocation, to determine whether such instances indicate that a process 104 has been the target of a code injection attack or has been otherwise compromised. In some cases, the alert module 124 may also perform one or more automatic interdiction actions to mitigate the risk due to the potentially compromised process 104. Automatic interdiction actions may include isolating the host computing device 102 where the process 104 executed, terminating the process 104 on one or more host computing devices 102, preventing the process 104 from launching on one or more host computing devices 102, limiting the communications performed by the process 104 on one or more host computing devices 102, or otherwise limiting the execution or functionality of the process 104. Such interdiction actions are described further with reference to FIG. 7.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environment 100 may be encrypted or otherwise secured. For example, such communications may employ one or more public or private cryptographic keys, ciphers, digital certificates, or other credentials supported by a security protocol such as any version of the Secure Sockets Layer (SSL) or the Transport Layer Security (TLS) protocol.

In cases where the performance data 108 may include data associated with one or more end users interacting with the process(es) 104 executing on the host computing devices 102, implementations may ensure the privacy of user data by requesting the permission of users to collect and analyze the user data. In some cases, such requests for permission may function as an opt in, such that the user data may not be collected or analyzed without the associated user's explicit permission. Alternatively, the requests for permission may function as an opt out, such that the user data may be collected and analyzed unless the associated user explicitly requests that such activities not be performed. In either case, security measures may be employed on the host computing device(s) 102 or the analysis server device(s) 116 to ensure the confidentiality of the performance data 108.

Figure 3:
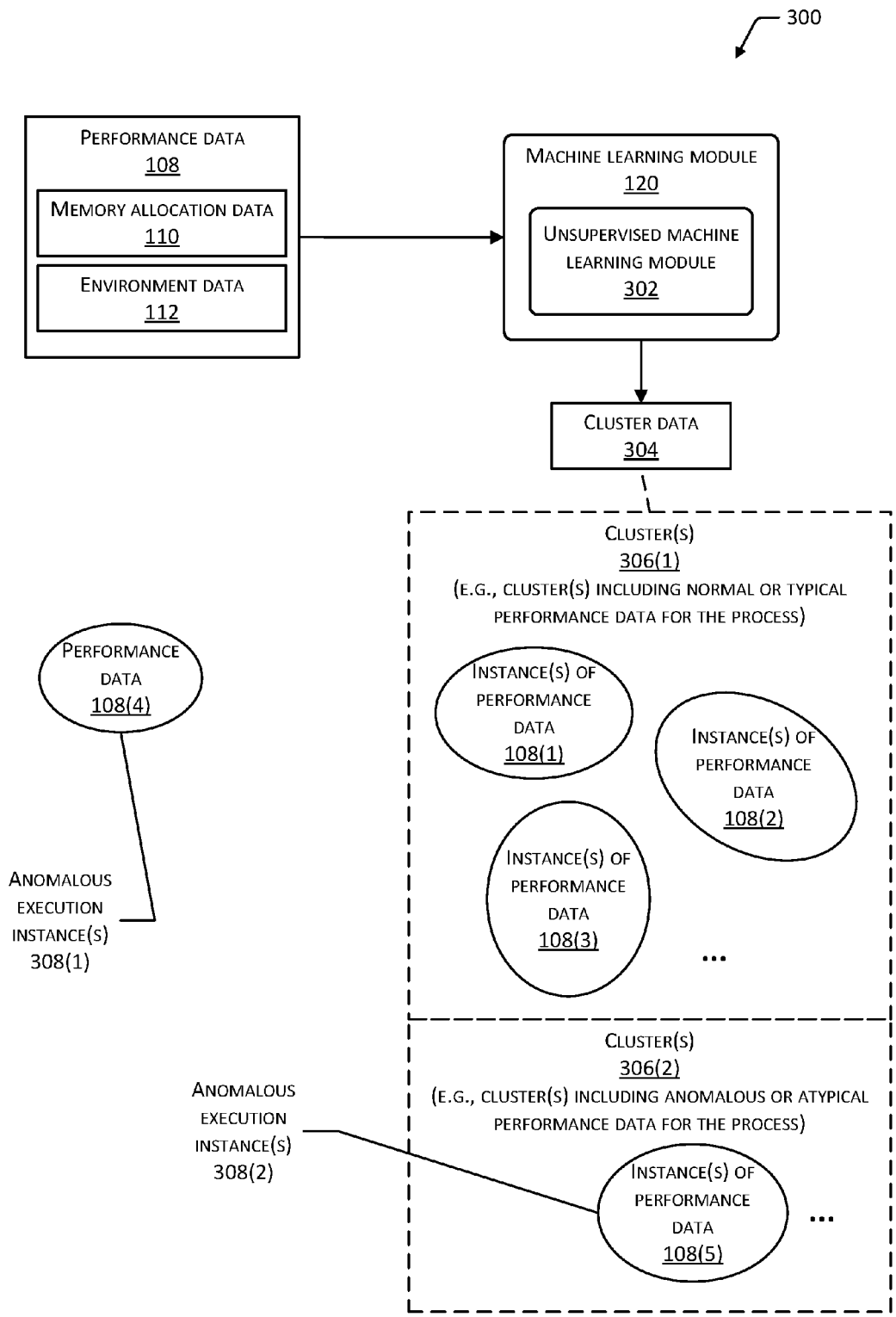
FIG. 3 depicts an example machine learning module that employs an unsupervised machine learning module to determine a plurality of clusters that include sets of performance data, the plurality of clusters employed to identify process execution instances that exhibit anomalous memory allocation.

FIG. 3 depicts a schematic 300 of an example of the machine learning module 120 that employs an unsupervised machine learning module 302. The unsupervised machine learning module 302 may receive and analyze the performance data 108. As described above, the performance data 108 may include any number of sets or vectors of performance data 108, where each set or vector describes an execution instance of a process 104 on a host computing device 102. Based on the application of a clustering machine learning algorithm to the performance data 108, the unsupervised machine learning module 302 may determine cluster data 304 that includes a plurality of clusters 306. Each of the plurality of clusters 306 may include one or more instances (e.g., sets or vectors) of the performance data 108, grouped according to a degree of similarity between the instances of performance data 108.

In some cases, the clusters 306 may include a first set of one or more clusters 306(1) that include instances of the performance data 108 that are substantially similar to one another in that they describe a substantially typical, normal, or average memory allocation for the process 104. In some cases, the clusters 306(1) may include multiple clusters 306 that describe substantially typical, normal, average, or otherwise non-suspicious memory allocations for the process 104 executing in a plurality of different environments or under a variety of conditions that are not indicative of an anomalous execution. Instances of performance data 108 that are substantially separate from the clusters 306(1) (e.g., separate in the performance data vector space) may be designated as anomalous execution instance(s) 308. In the example of FIG. 3, the instance of performance data 108(4) is outside the one or more clusters 306(1) that correspond to substantially typical performance data 108. Accordingly, the performance data 108(4) may be designated as an anomaly for further analysis.

In some cases, the cluster data 304 may also include a one or more clusters 306(2) that include instances of the performance data 108 that describe a substantially atypical, abnormal, or otherwise anomalous memory allocation for one or more execution instances of the process 104. Accordingly, the instances included in the cluster(s) 306(2) may exhibit a memory allocation that differs from the instances included in the cluster(s) 306(1). The instances for which the performance data 108 is included in the cluster(s) 306(2) may be designated as anomalous execution instances 308, and included in the anomaly information 122 for further analysis.

Implementations support the identification of anomalous execution instance(s) 308(1) that may include one or more individual instances of the performance data 108, as outlier(s) from the cluster(s) 306(1), such as the performance data 108(4) shown in FIG. 3. Implementations also support the identification of clusters 306(2) of anomalous execution instance(s) 308(2). Such cluster(s) 306(2) may include multiple instances of the performance data 108, in cases where multiple instances of the executing process 104 may have been similarly compromised through code injection or otherwise. In cases where there are infrequent occurrences of code injections or other types of security compromises of the process(es) 104, implementations may identify one or more anomalous execution instance(s) 308(1) that each manifests as a singular outlier relative to the cluster(s) 306(1). In some cases, outlier(s) may be identified as those instance(s) of the performance data 108 that are at least a threshold distance from the nearest cluster 306(1). The distance measurement may be relative to a variance, a deviation, a width, or some other measure of the size of the cluster(s) 306(1). For example, the performance data 108(4) may be designated as an anomalous execution instance 308(1) based on a determination that the performance data 108(4) is at a distance from the centroid of the nearest cluster 306(1), where the distance is at least six times the size of the smallest cluster 306(1). In cases where the vector space of the performance data 108 is an N-dimensional space, the distances may be distances within the N-dimensional space.

In cases where code injections are more frequent or at least somewhat systemic, implementations may identify cluster(s) 306(2) of anomalous execution instances 308(2). In some cases, the cluster(s) 306(2) (e.g., of anomalous performance data 108) may include a smaller number of instances of the performance data 108 than are included in the cluster(s) 306(1) (e.g., of normal performance data 108). In such cases, a determination may be made of the proportion of the number of instances of the performance data 108 in the cluster(s) 306(2) compared to the number of instances of the performance data 108 in the cluster(s) 306(1), or compared to a total number of instances of the performance data 108. If the proportion is below a predetermined threshold proportion, the cluster(s) 306(2) may be designated as anomalous execution instance(s) 308(2). For example, if a cluster 306 includes less than 10% of the instances of performance data 108 as one or more other clusters 306, or less than 1% of the total number of instances of performance data 108, the smaller population (e.g., low density) cluster 306 may be designated as including anomalous or atypical performance data 108.

In some cases, the cluster(s) 306(1) may include multiple clusters 306 that each corresponds to a particular configuration of the host computing device(s) 102 on which the process(es) 104 are executing. For example, the cluster(s) 306(1) may include multiple clusters 306 that each corresponds to an operating system or an operating system version that is running on the host computing device(s) 102, or that each corresponds to a particular hardware configuration (e.g., processor speed, storage capacity, networking capability, etc.) of the host computing device(s) 102. In such cases, the multiple clusters 306(1) may correspond to configuration variations within a normal or typical operating environment for the process(es) 104.

In some implementations, the unsupervised machine learning module 302 may employ an initial number of centroids that each corresponds to a point within the multi-dimensional vector space of the performance data 108. The unsupervised machine learning algorithm employed by the unsupervised machine learning module 302 may then begin building a cluster 306 around each of the centroids by determining which instances of the performance data 108 are within a distance of the centroid in the vector space. In some implementations, the number of centroids employed may correspond to a number of different hardware and/or software configurations among the host computing devices 102. For example, the number of centroids may correspond to a number of different operating systems, or different versions of an operating system, that are installed and executing on the host computing devices 102.

In some cases if the number of centroids employed by the unsupervised machine learning algorithm is too small, e.g., less than an optimal number of clusters 306(1) for describing normal or typical performance data 108, any anomalous execution instance(s) 308 may be subsumed in the cluster(s) 306(1) and mischaracterized as typical or normal performance data 108. Accordingly, in some implementations the unsupervised machine learning algorithm may iterate to determine cluster(s) 306(1) based on different numbers or positions of centroids. An optimal configuration (e.g., an optimal number and position) of centroids may be determined as the number and position of centroids that produces cluster(s) 306(1) including the largest number of instances of the performance data 108 among the different analyzed configurations of centroids. Alternatively, an optimal configuration of centroids may be determined as the number and position of centroids that produces cluster(s) 306(1) that include at least a predetermined threshold proportion of the instances of the performance data 108 that are included in the cluster(s) 306(1) (e.g., at least 95%). In such cases, the number or proportion of instances of the performance data 108 that are included in the cluster(s) 306(1) may be employed as a metric to measure a quality of the clustering based on a particular configuration of centroids.

The initial number of centroids employed may be based on variations in configurations of the host computing device(s) 102, such as variations of operating system, operating system version or revision, or hardware configuration. The unsupervised machine learning algorithm may then vary the position of the centroid(s), the number of the centroid(s), or both the position and number of centroid(s) until the algorithm determines a configuration of centroid(s) which results in an optimal (e.g., maximal or above threshold) number of instances of performance data 108 in the cluster(s) 306(1). Accordingly, the unsupervised machine learning algorithm may receive input parameters that include an initial number of centroids and a cluster width. The cluster width may indicate a maximum distance from an instance of the performance data 108 to the centroid for which the instance of the performance data 108 may be designated ask being within the cluster 306. The input parameters may also include the threshold distance (e.g., six times the cluster width) beyond which an instance of performance data 108 may be designated as an outlier, e.g., an anomalous execution instance 308.

Figure 4:
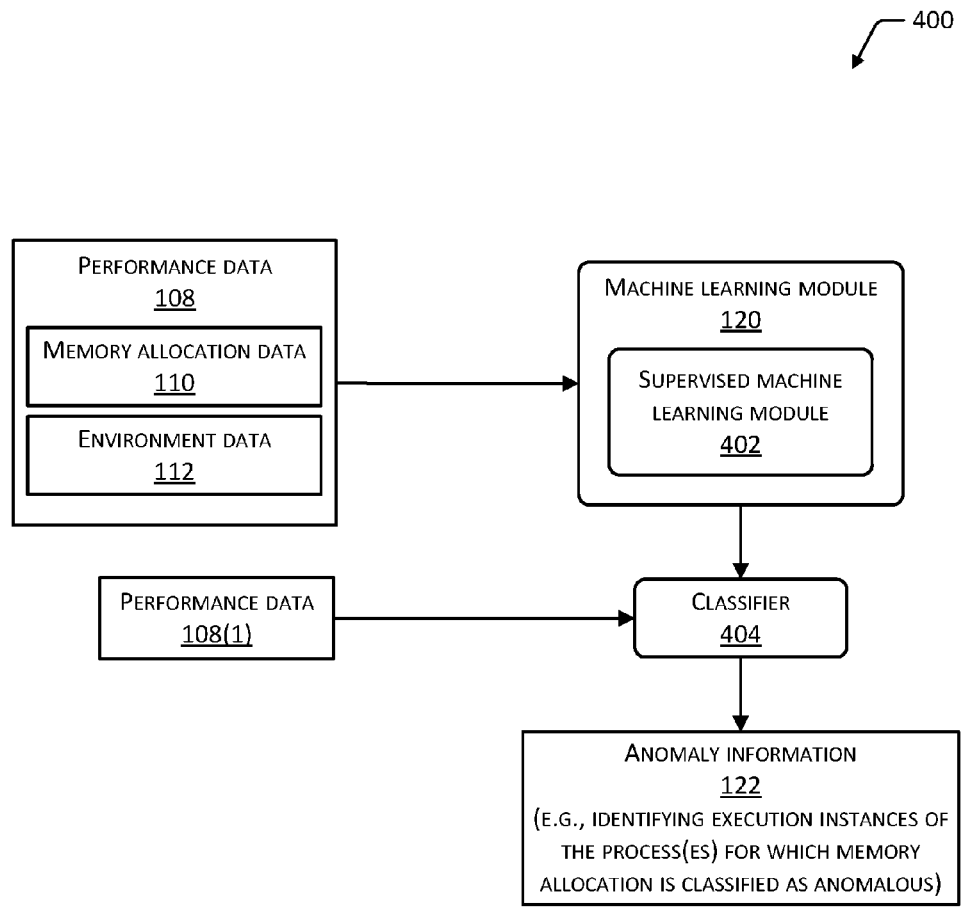
FIG. 4 depicts an example machine learning module that employs a supervised machine learning module to train a classifier, the classifier employed to classify process execution instances that exhibit anomalous memory allocation.

FIG. 4 depicts a schematic 400 of an example of the machine learning module 120 that employs a supervised machine learning module 402. The supervised machine learning module 402 may receive and analyze the performance data 108. As described above, the performance data 108 may include any number of instances (e.g., sets or vectors) of performance data 108, where each instance describes an execution instance of a process 104 on a host computing device 102. Previously collected instances of performance data 108 may be employed by the supervised machine learning module 402 to train a classifier 404. The classifier 404 may then operate to analyze incoming sets of performance data 108(1) and classify the performance data 108(1) as anomalous or not anomalous. In cases where the classifier 404 classifies a set of performance data 108(1) as anomalous, the execution instance of the process 104 associated with the performance data 108(1) may be identified or otherwise described in the anomaly information 122.

In some implementations, the classifier 404 may operate as a binary classifier 404 that classifies each set of incoming performance data 108 as either anomalous or not anomalous (e.g., either typical or atypical). Alternatively, the classifier 404 may classify each set of incoming performance data 108 into one of any number of categories or classes, e.g., the classifier 404 may operate as an N class classifier where N is greater than 1. For example, the classifier 404 may classify performance data 108 into three classes such as a high risk class, a medium risk class, or a low risk class, describing the level of risk that the process 104 has been subjected to code injection or otherwise compromised. The classes may be subjectively described (e.g., high, medium, or low) or described according to a scale or continuum of classes (e.g., a scale of 0 to 10 describing a risk level). As another example, the classes may be described as low risk (e.g., reflecting typical or normal performance), high risk (e.g., indicating that a code injection is likely to have occurred), or medium risk (e.g., indicating a lower but still substantial possibility that a code injection has occurred). In some cases, the classifier 404 may classify the performance data 108 into multiple classes that each indicates a different type of code injection that was made using a particular tool set, attack technique, or malware. For example, different classes may indicate code injections made to different targeted processes 104, or made to load different types of malicious code.

In some implementations, the performance data 108 may be employed as training data to train the classifier 404. In some cases, additional training data may be employed to train the classifier 404. Such additional training data may be generated based on operations of the unsupervised machine learning module 302, such as the results of the clustering algorithm described with reference to FIG. 3. For example, the instances of performance data 108 placed into the cluster(s) 306(1) (e.g., indicating normal or typical performance data 108) may be employed as true negatives, e.g., instances of performance data 108 that describe normal or typical behavior of the process(es) 104. The instances of the performance data 108 placed into the cluster(s) 306(2) or otherwise designated as anomalous execution instances 308 may be employed as true positives, e.g., instances of performance data 108 that describe anomalous behavior of the process(es) 104. The true negative and true positive instances may then be employed as training data to train the classifier 404.

In some cases, manual code injections may be made to a process 104 to create a modified version of the process 104. The modified version of the process 104 may then be executed, and additional performance data 108 may be collected during execution of the modified version. The collected additional performance data 108 may then be employed as additional training data to train the classifier 404. In some cases, one or more instances of the performance data 108 may be manually altered to synthesize additional training data. In some cases, training data may be created by altering operating conditions on one or more of the host computing devices 102. For example, processor load, networking load, storage capacity (e.g., used or available storage), or other operating conditions may be adjusted on a host computing device 102 while a process 104 is executing, and the performance data 108 may be collected during such conditions. The collected performance data 108 may then be employed as training data that exhibits typical or normal performance of the process 104. In cases where the classifier 404 classifies into multiple classes that are associated with different attack tool sets, attack techniques, or attack malware, training data may be generated manually by employing the particular tool sets, techniques, or malware against the process(es) 104 in a test environment.

In some implementations, the classifier 404 to be trained may be a two-class (e.g., binary) classifier 404, and the initial training of the classifier 404 may employ training data associated with one class, such as the performance data 108 for typical performance of the process(es) 104. Such training may generate a classifier 404 that identifies a boundary between typical and atypical performance data 108, where the boundary is a line or N-dimensional plane in the performance data vector space separating typical and atypical performance data 108. The classifier 404 may then begin classifying incoming performance data 108 based on the boundary. The results of the initial classification may be analyzed (e.g., manually), and instances of the performance data 108 that were accurately classified as atypical or typical may be employed as additional training data to further train the classifier 404.

Figure 5:
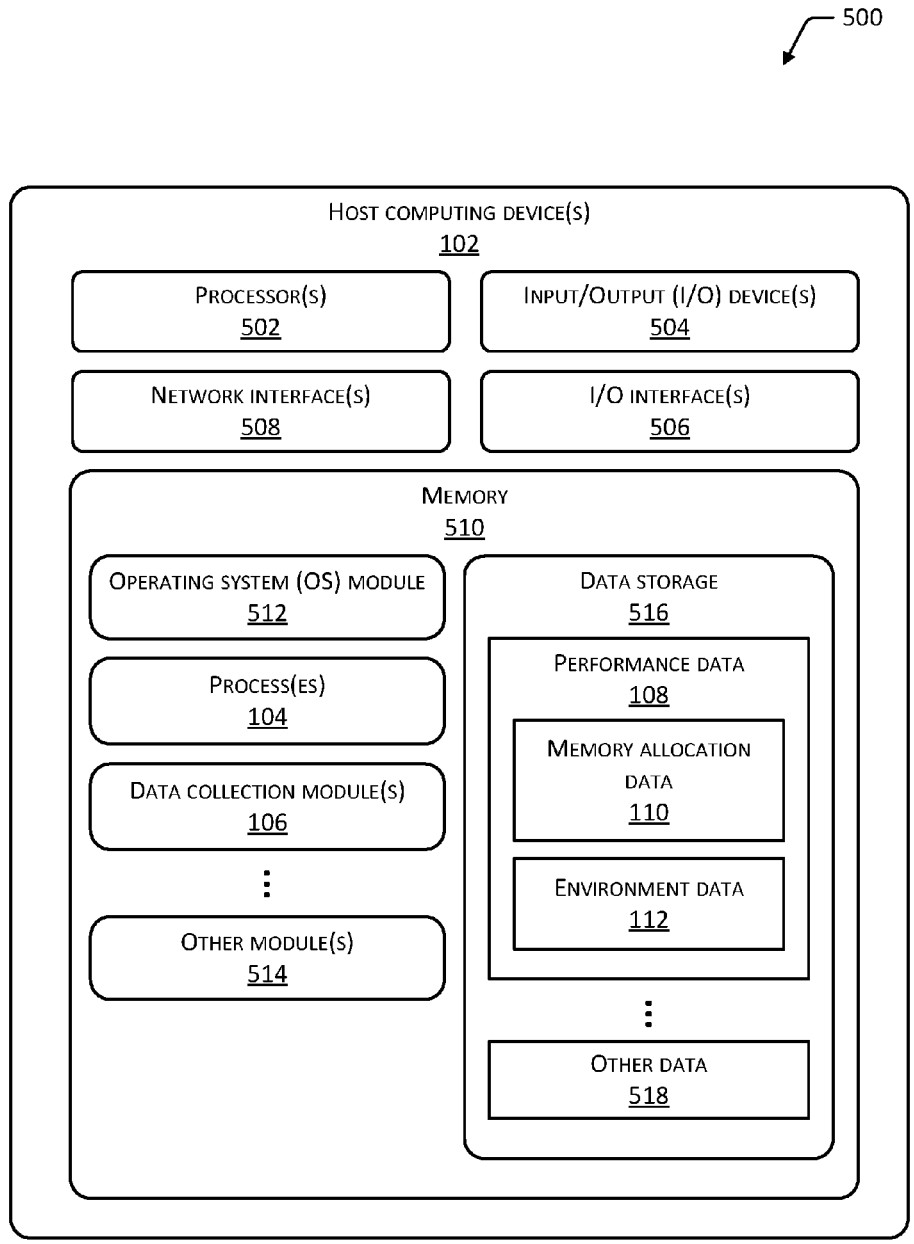
FIG. 5 depicts a block diagram of an example host computing device on which performance data may be collected.

FIG. 5 depicts a block diagram 500 of an example of the host computing device(s) 102 on which the performance data 108 may be collected. As shown in the block diagram 500, the host computing device 102 may include one or more processors 502 configured to execute one or more stored instructions. The processor(s) 502 may comprise one or more cores.

The host computing device 102 may include one or more input/output (I/O) devices 504. The I/O device(s) 504 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 504 may also include output devices such as a display, an audio output device (e.g., a speaker), a printer, a haptic output device, and so forth. The I/O device(s) 504 may be physically incorporated with the host computing device 102, or may be externally placed.

The host computing device 102 may include one or more I/O interfaces 506 to enable components or modules of the host computing device 102 to control, interface with, or otherwise communicate with the I/O device(s) 504. The I/O interface(s) 506 may enable information to be transferred in or out of the host computing device 102, or between components of the host computing device 102, through serial communication, parallel communication, or other types of communication. For example, the I/O interface(s) 506 may comply with a version of the RS-232 standard for serial ports, or with a version of the Institute of Electrical and Electronics Engineers (IEEE) 1284 standard for parallel ports. As another example, the I/O interface(s) 506 may be configured to provide a connection over Universal Serial Bus (USB) or Ethernet. In some cases, the I/O interface(s) 506 may be configured to provide a serial connection that is compliant with a version of the IEEE 1394 standard. The host computing device 102 may also include one or more busses or other internal communications hardware or software that allow for the transfer of data between the various modules and components of the host computing device 102.

The host computing device 102 may include one or more network interfaces 508 that enable communications between the host computing device 102 and other network accessible computing devices, such as the analysis server device(s) 116. The network interface(s) 508 may include one or more network interface controllers (NICs) or other types of transceiver devices configured to send and receive communications over a network.

The host computing device 102 may include one or more memories, described herein as memory 510. The memory 510 comprises one or more computer-readable storage media (CRSM). The CRSM may include one or more of an electronic storage medium, a magnetic storage medium, an optical storage medium, a quantum storage medium, a mechanical computer storage medium, and so forth. The memory 510 provides storage of computer-readable instructions that may describe data structures, program modules, processes, applications, or other data for the operation of the host computing device 102. In some implementations, the memory 510 may provide storage of computer-readable instructions or other information in a non-transitory format.

The memory 510 may include an operating system (OS) module 512. The OS module 512 may be configured to manage hardware resources such as the I/O device(s) 504, the I/O interface(s) 506, and the network interface(s) 508, and to provide various services to applications, processes, or modules executing on the processor(s) 502. The OS module 512 may include one or more of the following: any version of the Linux™ operating system; any version of iOS™ from Apple™ Corp. of Cupertino, Calif., USA; any version of Windows™ or Windows Mobile™ from Microsoft™ Corp. of Redmond, Wash., USA; any version of Android™ from Google™ Corp. of Mountain View, Calif., USA and its derivatives from various sources; any version of Palm OS™ from Palm Computing™, Inc. of Sunnyvale, Calif., USA and its derivatives from various sources; any version of BlackBerry OS™ from Research In Motion™ Ltd. of Waterloo, Ontario, Canada; any version of VxWorks™ from Wind River Systems™ of Alameda, Calif., USA; or other operating systems.

The memory 510 may include one or more of the modules described above as executing on the host computing device 102, such as the process(es) 104 and the data collection module(s) 106. The memory 510 may also include one or more other modules 514, such as a user authentication module or an access control module to secure access to the host computing device 102, and so forth.

The memory 510 may include data storage 516 to store data for operations of the host computing device 102. The data storage 516 may comprise a database, array, structured list, tree, or other data structure, and may be a relational or a non-relational datastore. The data storage 516 may store data such as that described above, including one or more of the performance data 108, the memory allocation data 110, or the environment data 112. The data storage 516 may also store other data 518, such as user authentication information or access control data. In some implementations, at least a portion of the information stored in the data storage 516 may be stored externally to the host computing device 102, on other devices that may communicate with the host computing device 102 via the I/O interface(s) 506 or via the network interface(s) 508.

Figure 6:
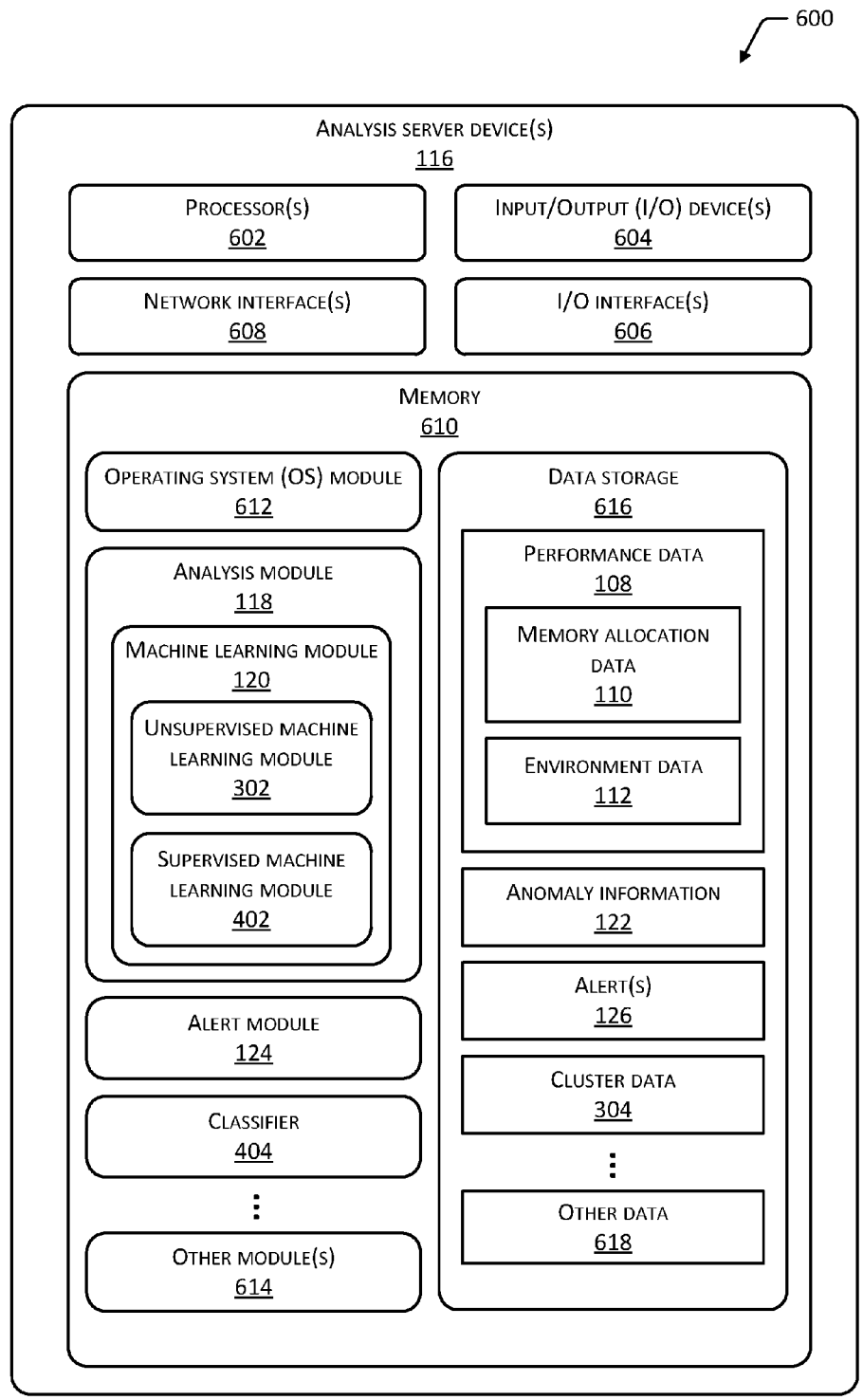
FIG. 6 depicts a block diagram of an example analysis server device on which performance data may be analyzed to identify process execution instances that exhibit anomalous memory allocation.

FIG. 6 depicts a block diagram 600 of an example of the analysis server device(s) 116 on which the performance data 108 may be analyzed to identify process execution instances that exhibit anomalous memory allocation. As shown in the block diagram 600, the analysis server device 116 may include one or more processors 602 configured to execute one or more stored instructions. The processor(s) 602 may comprise one or more cores. The analysis server device 116 may include one or more I/O devices 604, one or more I/O interfaces 606, and one or more network interfaces 608 as described above respectively with reference to the I/O device(s) 504, the I/O interface(s) 506, and the network interface(s) 508.

The analysis server device 116 may include one or more memories, described herein as memory 610. The memory 610 comprises one or more CRSM, as described above with reference to the memory 510. The memory 610 may include an OS module 612 that is configured to manage hardware resources such as the I/O device(s) 604, the I/O interface(s) 606, and the network interface(s) 608, and to provide various services to applications, processes, or modules executing on the processor(s) 602. The OS module 612 may include one or more of the operating systems described above with reference to the OS module 512. The memory 610 may include one or more of the modules described above as executing on the analysis server device 116, such as the analysis module 118, the machine learning module 120, the unsupervised machine learning module 302, the supervised machine learning module 402, the alert module 124, and the classifier 404. In various implementations, the machine learning module 120 may include one or both of the unsupervised machine learning module 302 and the supervised machine learning module 402. Although the unsupervised machine learning module 302 and the supervised machine learning module 402 are described herein as sub-modules, sub-components, or sub-processes of the machine learning module 120, and the machine learning module 120 is described herein as a sub-module, sub-component, or sub-process of the analysis module 118, one or more of these modules may execute independently as a separate module, component, or process. The memory 610 may also include one or more other modules 614, such as a user authentication module or an access control module to secure access to the analysis server device 116, and so forth.

The memory 610 may include data storage 616 to store data for operations of the analysis server device 116. The data storage 616 may comprise a database, array, structured list, tree, or other data structure, and may be a relational or a non-relational datastore. The data storage 616 may store data such as that described above, including one or more of the performance data 108, the memory allocation data 110, the environment data 112, the anomaly information 122, the alert(s) 126, or the cluster data 304. The data storage 616 may also store other data 618, such as user authentication information or access control data. In some implementations, at least a portion of the information stored in the data storage 616 may be stored externally to the analysis server device 116, on other devices that may communicate with the analysis server device 116 via the I/O interface(s) 606 or via the network interface(s) 608.

Figure 7:
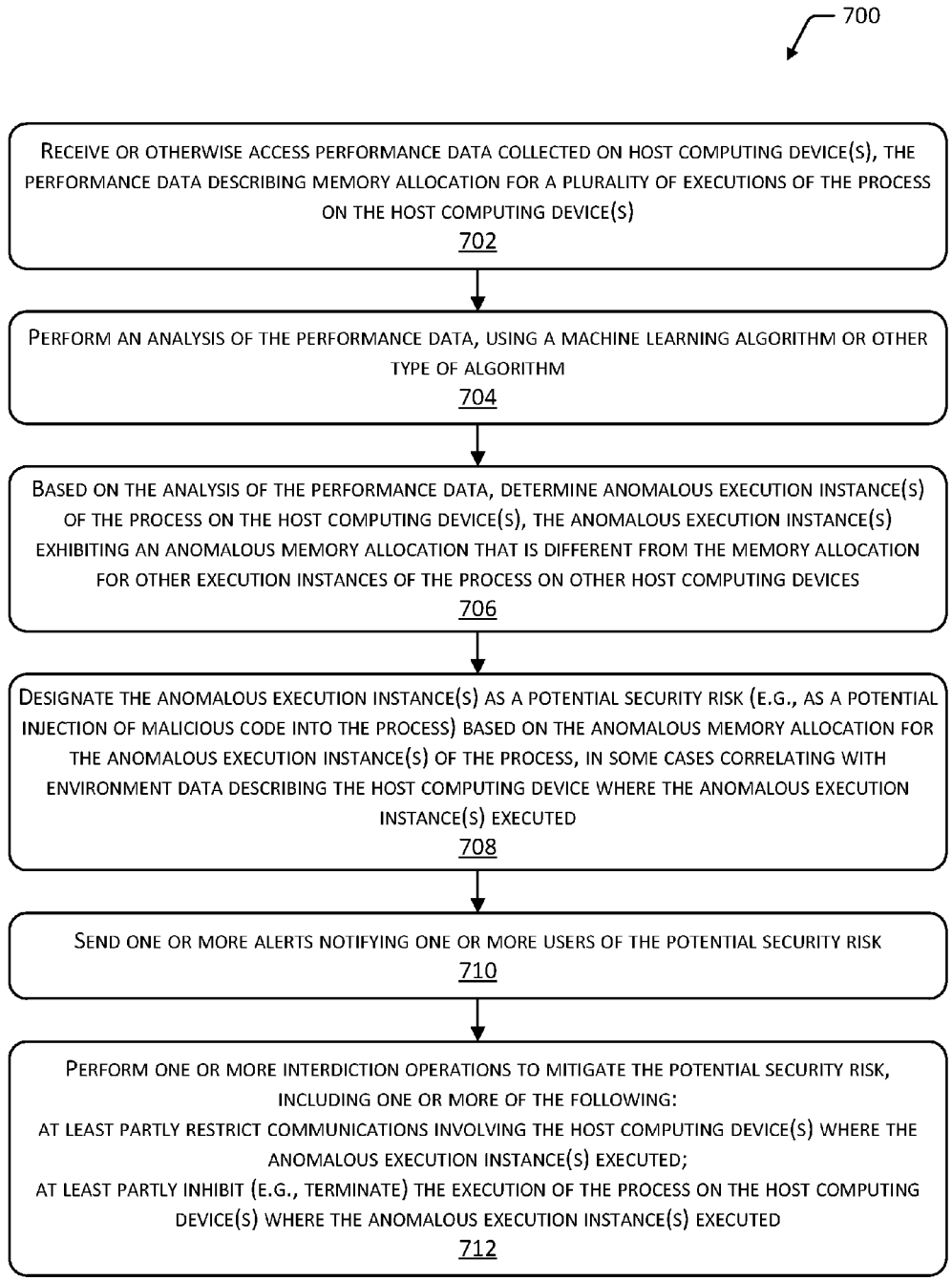
FIG. 7 depicts a flow diagram of a process for analyzing performance data to identify process execution instances that exhibit anomalous memory allocation.

FIG. 7 depicts a flow diagram 700 of a process for analyzing the performance data 108 to identify process execution instances that exhibit anomalous memory allocation. One or more operations of the process may be performed by the analysis module 118, the machine learning module 120, the alert module 124, the unsupervised machine learning module 302, the supervised machine learning module 402, or by other modules executing on the analysis server device(s) 116 or elsewhere.

At 702, the performance data 108 is received from the host computing device(s) 102, retrieved from the storage device(s) 114, or otherwise accessed. As described above, the performance data 108 may include any number of sets or vectors of performance data 108, each set or vector collected on a host computing device 102 during the execution of a process 104. In some cases, the performance data 108 may include a plurality of sets or vectors of performance data 108 collected during the execution of the same process 104 on a plurality of host computing devices 102.

At 704, an analysis of the performance data 108 may be performed. The analysis may employ a machine learning algorithm as described further with reference to FIGS. 9 and 10. In some cases, the analysis may employ a statistical method to identify deviations from a norm or average, as described further with reference to FIG. 8.

At 706, based on the analysis of the performance data 108, a determination may be made of at least one anomalous execution instance of the process 104 on at least one of the plurality of host computing devices 102. The at least one anomalous execution instance may exhibit an anomalous memory allocation that is different from the memory allocation for other execution instances of the process 104 on other host computing devices 102. The at least one anomalous execution instance may be described in the anomaly information 122.

At 708, the at least one anomalous execution instance of the process 104 may be designated as a potential security risk based on the anomalous memory allocation determined at 706. The potential security risk may include a potential injection of malicious or otherwise unauthorized executable code into the process 104, where such code injection may have led to the anomalous memory allocation during execution of the process 104. In some implementations, the potential security risk may be designated based on correlating the at least one anomalous execution instance of the process 104 with one or more elements of the environment data 112 collected during execution of the process 104 as described above.

At 710, one or more alerts 126 may be sent to notify one or more users of the potential security risk evidenced by the anomalous memory allocation. The alert(s) 126 may include information to enable a manual investigation of the potential security risk by the one or more users. Moreover, in some implementations the alert(s) 126 may be sent to other processes or devices which may perform further operations in response to receiving the alert(s) 126. In some cases, the alert(s) 126 may include additional information to enable users, processes, or devices to investigate the potential security risk, such as a stack dump, a record of the code mapped to memory, information regarding stack allocation, a description of open network connections, and so forth.

At 712, in some implementations one or more interdiction operations may be automatically performed to mitigate the potential security risk. Such interdiction operations may include, but are not limited to, one or more of the following:

at least partly restricting communications involving the host computing device(s) 102 where the anomalous execution instance(s) of the process 104 were executed, e.g., to isolate or quarantine the potentially comprised host computing device(s) 102;

at least partly inhibiting (e.g., terminating) the execution of the process 104 on the host computing device(s) 102 where the anomalous execution instance(s) of the process 104 were executed, or on other host computing device(s) 102;

preventing the subsequent execution of the process 104 on one or more of the host computing devices 102;

limiting the communications performed by the process 104 on one or more host computing devices 102;

otherwise limiting the execution or functionality of the process 104, or limiting the operations of the host computing device(s) 102; or performing one or more operations (e.g., a binary diff) to identify differences between a binary executable of the process 104 that exhibited the anomalous memory allocation and a known good (e.g., uncompromised) version of the binary executable.

Moreover, in some implementations the interdiction operation(s) may include pausing the execution of all processes on the host computing device 102 where the anomalous memory allocation was exhibited. Such pausing may include pausing the executing processes between instructions or between CPU cycles to enable an analysis of the state of the paused system. In such cases, the executing processes (including the potentially compromised process 104) may not be aware that instruction processing has paused on the host computing device 102, enabling an analysis of the system state to proceed without triggering any potential countermeasures or circumvention measures incorporated into the malicious code. The pausing may be enabled on a host computing device 102 that includes processor(s) 502 particularly configured to enable the pausing. The pausing may also be available in cases where the host computing device 102 is a hypervisor or virtualization with a configurable, software emulation of the processor(s) 502.

Figure 8:
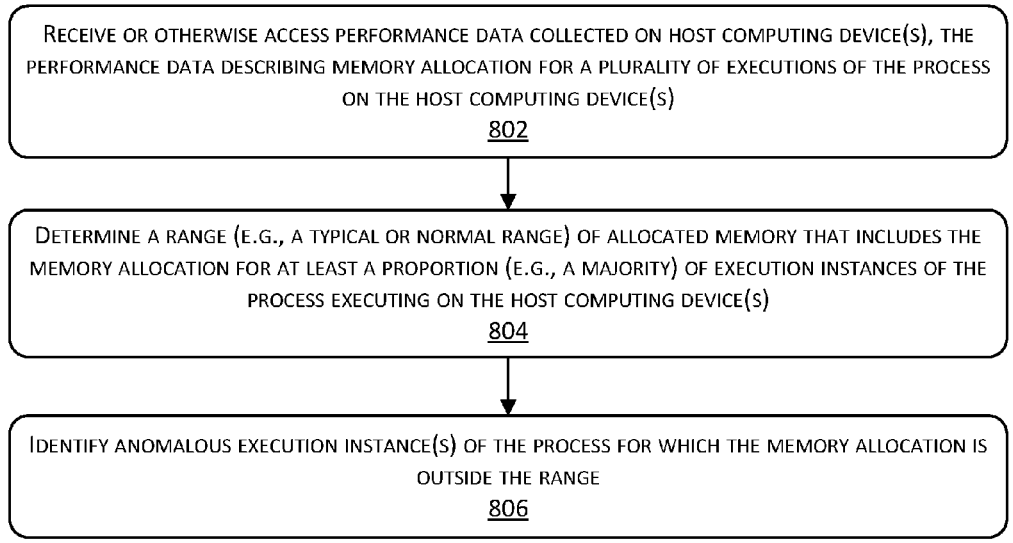
FIG. 8 depicts a flow diagram of a process for identifying process execution instances that exhibit anomalous memory allocation, based on identifying a memory allocation that is outside a range (e.g., a typical or normal range) of allocated memory for an executing process.

FIG. 8 depicts a flow diagram 800 of a process for identifying process execution instances that exhibit anomalous memory allocation, based on a statistical analysis of the performance data 108. One or more operations of the process may be performed by the analysis module 118, the alert module 124, or by other modules executing on the analysis server device(s) 116 or elsewhere.

At 802, the performance data 108 is received or otherwise accessed as described above with reference to 702. At 804, a range of allocated memory is determined for the process 104. The range may be a typical or normal range of the amount of memory allocated for the process 104 during its execution. In some cases, the range may include the amount of memory allocated during at least a proportion (e.g., a majority) of the execution instances of the process 104. For example, based on the performance data 108 it may be determined that 90% of the execution instances of a particular process 104 exhibit memory allocation ranging between 100 and 200 kilobytes, and this range may be designated as the typical or normal range of memory allocation for the process 104. In some cases, the range may be determined based on the allocated memory 206 included in the performance data 108 for a plurality of execution instances, and may be adjusted based on the environment data 112.

At 806, each set or vector of the performance data 108 may be analyzed to determine whether it describes a memory allocation that is outside the range determined at 804. Such outliers may be designated as anomalous execution instances of the process 104, and may be incorporated into the anomaly information 122. As described herein, an execution instance for which the memory allocation is higher than the range may indicate that the process 104 has been the target of a code injection or is otherwise compromised. In some cases, an execution instance for which the memory allocation is lower than the range may indicate that the process 104 has been replaced with another process (e.g., a malicious process) that is impersonating the replaced process 104. In either case, the anomalous execution instance may be designated as a security risk for further analysis.

Implementations support the use of any statistical measures or methods to identify anomalous execution instances for the process 104. In some implementations, at 804 anomalous execution instance(s) may be identified as those execution instances for which the memory allocation is outside a predetermined number of statistical variances or standard deviations (e.g., sigmas) of the distribution of memory allocation statistics for the process 104. For example, an anomalous execution instance may be identified if it exhibits a memory allocation that is outside two standard deviations from the mean or average of the distribution of memory allocations.

Figure 9:
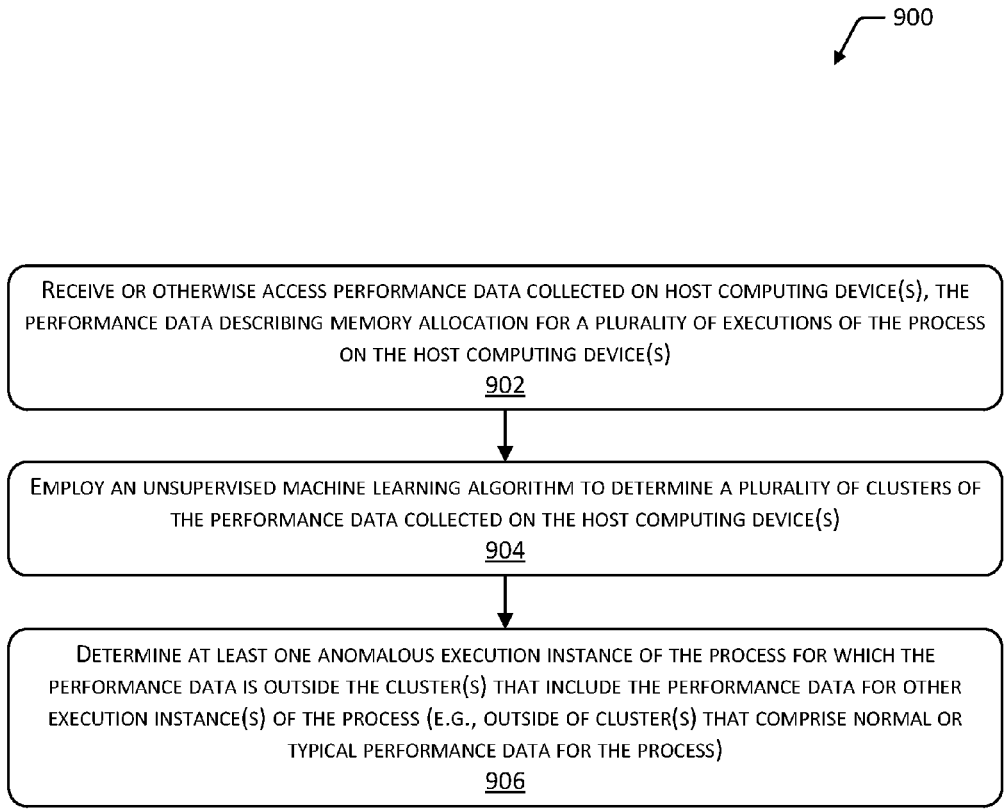
FIG. 9 depicts a flow diagram of a process for identifying process execution instances that exhibit anomalous memory allocation, based on an unsupervised machine learning algorithm.

FIG. 9 depicts a flow diagram 900 of a process for identifying process execution instances that exhibit anomalous memory allocation, based on an unsupervised machine learning algorithm. One or more operations of the process may be performed by the analysis module 118, the machine learning module 120, the alert module 124, the unsupervised machine learning module 302, or by other modules executing on the analysis server device(s) 116 or elsewhere.

At 902, the performance data 108 is received or otherwise accessed as described above with reference to 702. At 904, an unsupervised machine learning algorithm may be employed to determine a plurality of clusters 306 of the performance data 108 collected on the plurality of host computing devices 102, as described above with reference to FIG. 3.

At 906, at least one anomalous execution instance of the process 104 may be determined for which the performance data 108 is outside the cluster(s) 306(1) that include typical or normal memory allocation for the process 104, as described with reference to FIG. 3. The anomalous execution instance(s) of the process 104 may be described in the anomaly information 122. In some cases, the determination that a set or vector of performance data 108 is outside the cluster(s) 306(1) may be an automatic determination performed by the analysis module 118 or some other process. Alternatively, the determination may be based on a manual examination of the cluster data 304 by one or more users.

Figure 10:
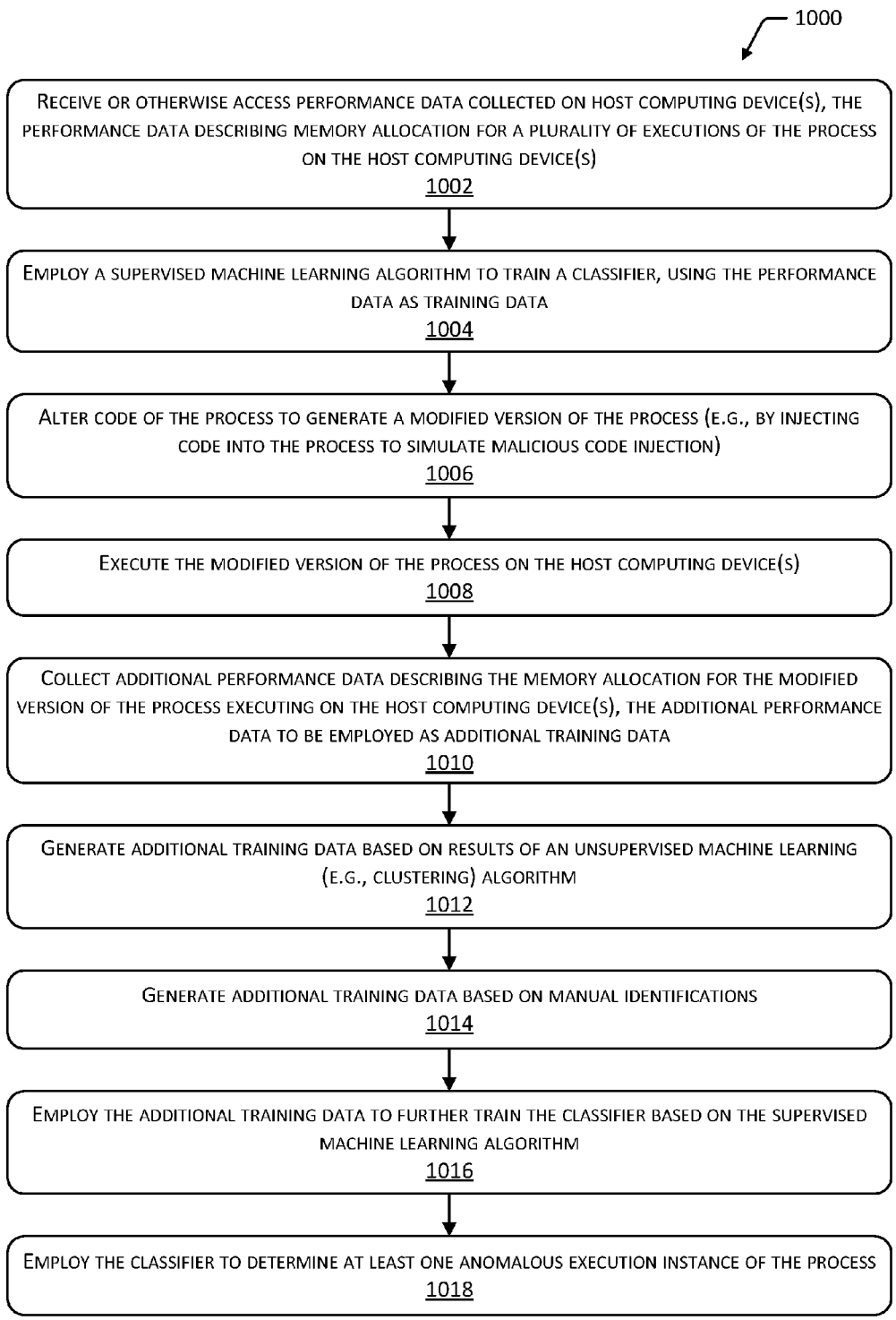
FIG. 10 depicts a flow diagram of a process for identifying process execution instances that exhibit anomalous memory allocation, based on a supervised machine learning algorithm.

FIG. 10 depicts a flow diagram 1000 of a process for identifying process execution instances that exhibit anomalous memory allocation, based on a supervised machine learning algorithm. One or more operations of the process may be performed by the analysis module 118, the machine learning module 120, the alert module 124, the supervised machine learning module 402, or by other modules executing on the analysis server device(s) 116 or elsewhere.

At 1002, the performance data 108 is received or otherwise accessed as described above with reference to 902. At 1004, a supervised machine learning algorithm may be employed to train the classifier 404, using the collected performance data 108 as training data, as described above with reference to FIG. 4.

In some implementations, manual testing may be employed to generate additional training data to train the classifier 404. At 1006, the executable code of the process 104 may be altered to generate a modified version of the process 104 to be executed on one or more host computing devices 102. The altering may include injecting code to simulate a malicious code injection attack against the process 104. At 1008, the modified version of the process 104 may be executed on one or more host computing devices 102. At 1010, additional performance data 108 may be collected during the execution of the modified version of the process 104. The additional performance data 108 may describe the amount of memory allocated for the modified version of the process 104 during its execution. The additional performance data 108 collected at 1010 may be employed as additional training data to train the classifier 404. In this way, implementations may enable the generation of positive (or negative) test cases of known results, to be used in further training the classifier 404.

In some implementations, at 1012 additional training data may be generated based on the results of an unsupervised machine learning algorithm, such as the clustering operations described with reference to FIGS. 3 and 9. At 1014, additional training data may be manually generated based on user identification of true positives (e.g., instances where implementations correctly identified an anomalous execution instance), false positives (e.g., instances where implementations incorrectly identified an anomalous execution instance), true negatives (e.g., instances where implementations correctly identified a non-anomalous execution instance), and false negatives (e.g., instances where implementations incorrectly identified a non-anomalous execution instance). At 1016, the additional training data generated at 1010, 1012, and 1014 may be employed to further train the classifier 404 based on the supervised machine learning algorithm.

At 1018, the classifier 404 may be employed to analyze subsequently collected and received performance data 108 for an execution instance of the process 104, and to classify the performance data 108. As described above with reference to FIG. 4, in some cases the classifier 404 may perform a binary classification of the performance data 108 into either an anomalous class or a non-anomalous class. Alternatively, the classifier 404 may classify the performance data 108 into one of any number of classes that describe degrees or gradations of risk that the performance data 108 indicates a security breach (e.g., a code injection). The classification of the performance data 108 as anomalous may include incorporating a description of the at least one anomalous execution instance into the anomaly information 122.

Although the examples herein describe analyzing the memory allocation for the process 104 to identify a potentially malicious code injection into the process 104, implementations may also be employed to identify other types of attacks or security risks based on memory allocation analysis. For example, in some cases the memory allocation or utilization for a process 104 may increase if the process 104 is the target of a denial of service (DOS) attack. Implementations may identify potential DOS attacks based on anomalous memory allocation for the process 104.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method, comprising:
  collecting performance data for one or more executions of a process on one or more computing devices, the performance data describing memory allocation for a plurality of executions of the process on the one or more computing devices;
  establishing a baseline of memory allocation for the plurality of executions of the process by applying a statistical distribution to the performance data collected on the one or more computing devices;
  comparing a memory allocation for the executing process to the baseline using a machine learning algorithm;
  based on the comparing the memory allocation for the executing process to the baseline, determining at least one anomalous execution instance of the process that is outside a predetermined number of statistical variances of the baseline; and
  sending an alert that designates the at least one anomalous execution instance of the process as a security risk, including an injection of malicious code into the process on the one or more computing devices.

2. The method of claim 1, wherein the determining the at least one anomalous execution instance of the process comprising:

determining a plurality of clusters of the performance data for the one or more execution instances of the process that is separate from the at least one anomalous execution instance.

3. The method of claim 1, further comprising:
training the machine learning algorithm to determine the at least one anomalous execution instance of the process.

4. The method of claim 3, further comprising:
generating training data by injecting modified code to provide a modified version of the process; and
training the machine learning algorithm using performance data collected from execution of the modified version of the process.

5. A system, comprising:
a processor; and
a memory device communicatively coupled to the processor, the memory device storing instructions which when executed by the processor, cause the processor to execute one or more services, wherein the one or more services operating to:
collect performance data for one or more executions of a process on one or more computing devices, the performance data describing memory allocation for a plurality of executions of the process on the one or more computing devices;
establish a baseline of memory allocation for the plurality of executions of the process by applying a statistical distribution to the performance data collected on the one or more computing devices;
compare a memory allocation for the executing process to the baseline using a machine learning algorithm;
based the memory allocation for the executing process being compared to the baseline, determine at least one anomalous execution instance of the process that is outside a predetermined number of statistical variances of the baseline; and
designate the at least one anomalous execution instance of the process as a security risk based at least partly on the anomalous memory allocation for the at least one anomalous execution instance of the process.

6. The system of claim 5, the anomalous memory allocation is analyzed to determine if code has been injected into the process on the one or more computing devices.

7. The system of claim 5, the one or more services determining the at least one anomalous execution instance of the process by determining a plurality of clusters of the performance data for the one or more execution instances of the process that is separate from the at least one anomalous execution instance.

8. The system of claim 5, the performance data is used as training data to train a classifier, the classifier identifying the at least one anomalous execution instance of the process.

9. The system of claim 8, the process having code altered to generate a modified version of the process, the one or more services executing the modified version of the process to collect additional performance data describing the memory allocation for the modified version of the process and employing the additional performance data as the training data to further train the classifier.

10. The system of claim 5, the one or more services determining a range of allocated memory that includes the memory allocation for at least a proportion of execution instances of the process by analyzing the performance data and identifying the at least one anomalous execution instance of the process based on the anomalous memory allocation being outside the range.

11. The system of claim 5, the designating of the at least one anomalous execution instance of the process as the security risk is further based on correlating the anomalous memory allocation with at least a portion of the environment data.

12. The system of claim 5, the performance data further describes environment data describing operations of the computing devices during execution of the at least one anomalous execution instance;
the environment data comprises one or more of:
one or more registry settings on the computing devices;
a description of processes executing on the computing devices;
a description of files present on the computing devices;
an identification of an operating system installed on the computing devices;
total memory allocation for processes executing on the computing devices;
a description of hardware components included in the computing devices;
a description of network connections active on the computing devices; or
a description of shared libraries loaded in memory on the computing devices.

13. The system of claim 5, the one or more services operating to perform an interdiction operation to mitigate the potential security risk including at least partly restricting communications to isolate the one or more computing devices.

14. The system of claim 5, the one or more services operating to at least partly inhibit execution of the process on the one or more computing devices where the at least one anomalous execution instance executed, based at least partly on the designating of the at least one anomalous execution instance as the security risk.

15. One or more non-transitory computer-readable media storing instructions which, when executed by at least one processor, instruct the at least one processor to perform actions comprising:
collecting performance data for one or more executions of a process on one or more computing devices, the performance data describing memory allocation for a plurality of executions of the process on the one or more computing devices;
establishing a baseline of memory allocation for the plurality of executions of the process by applying a statistical distribution to the performance data collected on the one or more computing devices;
comparing a memory allocation for the executing process to the baseline using a machine learning algorithm;
identifying at least one anomalous execution instance of the process that is separated from the baseline by a predetermined distance;
designating the at least one anomalous execution instance of the process as a security risk based at least partly on the anomalous memory allocation for the at least one anomalous execution instance of the process being separated from the baseline by a threshold distance; and
flagging the at least one anomalous execution instance of the process for further analysis to determine whether the at least one anomalous execution instance of the process is caused by injection of malicious code into the process.

16. The one or more non-transitory computer-readable media of claim 15, the identifying the at least one anomalous execution instance of the process includes determining a plurality of clusters of the performance data collected on the one or more computing devices and the at least one anomalous execution instance of the process being identified where the performance data for the at least one anomalous execution instance is outside one or more of the plurality of clusters.

17. The one or more non-transitory computer-readable media of claim 15, the identifying the at least one anomalous execution instance of the process includes training a classifier using the performance data as training data and employing the classifier to determine the at least one anomalous execution instance of the process.

18. The one or more non-transitory computer-readable media of claim 15, the process having code altered to generate a modified version of the process, the one or more services executing the modified version of the process to collect additional performance data describing the memory allocation for the modified version of the process and employing the additional performance data as training data to further train the classifier.

19. The one or more non-transitory computer-readable media of claim 15, the one or more services determining a range of allocated memory that includes the memory allocation for at least a proportion of execution instances of the process by analyzing the performance data and the identifying the at least one anomalous execution instance of the process based on the anomalous memory allocation being outside the range.

20. The one or more non-transitory computer-readable media of claim 15, the one or more services operating to perform an interdiction operation to mitigate the potential security risk including at least partly restricting communications to isolate the one or more computing device.

* * * * *